April 27, 1943.   W. L. BENEDICT   2,317,600
TREATING HYDROCARBON DISTILLATE
Filed March 30, 1940
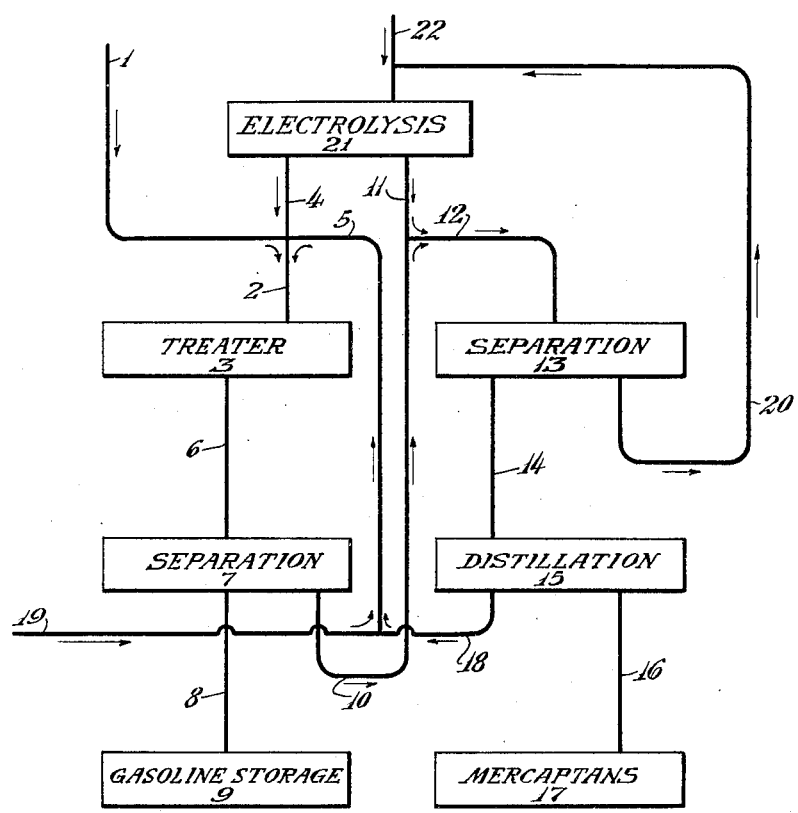
Inventor:
Wayne L. Benedict
By Lee J. Gary
Attorney.

Patented Apr. 27, 1943

2,317,600

UNITED STATES PATENT OFFICE 2,317,600

TREATING HYDROCARBON DISTILLATE

Wayne L. Benedict, Chicago, Ill., assignor to Universal Oil Products Company, Chicago, Ill., a corporation of Delaware Application March 30, 1940, Serial No. 326,929

3 Claims. (Cl. 204—136)

This invention relates to a process for treating hydrocarbon distillates to remove mercaptan-sulfur therefrom. More particularly it concerns the treating of straight run and cracked gasolines to effect partial or complete sweetening thereof by removing the mercaptan sulfur by means of solutions of sodium hydroxide and sodium phenolate followed by the recovery and regeneration of the treating solutions for further use in the process.

Solutions of alkali metal hydroxides have been used to remove mercaptans from gasoline and the method of improving the efficiency of this process by adding thereto relatively low molecular weight phenols has been practiced. The usual method of recovery and regeneration of such solutions is to treat them at relatively elevated temperatures with steam in order to hydrolyze the sodium phenolates and to remove them by steam distillation.

This process is open to the objection that there is a gradual accumulation of sodium salts which are ineffective in so far as assisting in the treating effect is concerned due to the unavoidable presence in the steam used of small quantities of oxygen. As a consequence the solution must be discarded from time to time or a portion of it must be removed and discarded, being replaced with fresh caustic solution. The present invention provides a means of continuously treating gasoline to remove the mercaptans together with a continuous method for regenerating the treating solution.

In one specific embodiment the present invention comprises a process for improving the properties of hydrocarbon distillates which consists in treating said distillate with a solution of alkali metal hydroxide containing a minor quantity of a relatively low boiling phenol, separating and recovering the treated gasoline, mixing the spent treating solution with a solution of sodium bicarbonate produced as hereinafter described, decanting the phenols and mercaptans thus liberated, separating the mercaptans from the phenols by distillation, returning the phenols for further use in the process, passing the aqueous solution of sodium carbonate produced by the addition of the sodium bicarbonate to the spent treating solution to an electrolysis step, electrolyzing said solution to produce a solution of sodium hydroxide for use in the treating step and a solution of sodium bicarbonate for use in freeing the aforesaid phenols and mercaptans, and returning said sodium hydroxide to said treating step.

The invention is further illustrated by the accompanying drawing which diagrammatically illustrates the various steps of the process but should not be interpreted as limiting it to the exact conditions illustrated therein.

Sour hydrocarbon distillate such as gasoline is introduced through line 1 and line 2 to treater 3. The gasoline is mixed with sodium hydroxide solution from line 4, said sodium hydroxide solution being produced as hereinafter described. It may or may not be mixed with low boiling phenols from line 5. The amount of sodium hydroxide solution is dependent to a certain extent upon the concentration of the solution used, but usually varies within the limits of approximately 5% by volume to equal parts by volume. The amount of phenol added to the solution is ordinarily of the order of 2–20% by volume of the sodium hydroxide solution introduced. Usually it is desirable to maintain an excess of sodium hydroxide in the solution over that required to form the sodium salts of the phenols added. The contacting is carried out in any suitable fashion, preferably being of a countercurrent type whereby the greatest effect of the treating solution can be obtained. Such methods are well-known in the art and need not be described herein. Instead of sodium, solutions of the other alkali metal compounds such as those of potassium, lithium, etc., may be employed. Because of its availability and low cost, sodium hydroxide is preferred. The mixture passes through line 6 to separator 7. The treated gasoline passes through line 8 to gasoline storage 9. It is within the scope of the invention, although the means is not shown in the drawing, to contact the gasoline leaving separation step 7 with a relatively small volume of caustic soda solution containing no phenols in order to recover such traces of phenols as may remain therein from the treating step. The spent treating solution is removed through line 10. It is mixed with sodium bicarbonate solution from line 11 whereby the sodium compounds are converted to sodium carbonate and the mixture passes through line 12 to separation step 13. The temperature may be of the order of 100–200° F. or higher. Because of the low degree of solubility of phenols and mercaptans in sodium carbonate solutions, the phenols in the treating solution are liberated and contain the mercaptans in solution. These are separated usually by gravity methods and the phenol-mercaptan solution passes through line 14 to distillation step 15 wherein the mercaptans are recovered from the phenols by distillation preferably in the presence of steam. The mercaptans boil lower than the phenols and hence are readily removed. The mercaptans pass through line 16 to mercaptan storage 17 and may be disposed of in any desired way. They may be used for example as odorants for illuminating gas, etc. When no phenols are used in this treating step, the mercaptans may be removed from the aqueous solution by skimming or by distillation, with or without the use of steam. The purified phenols pass through line 18 to line 5 and are thus reused in the process. Line 19 serves as a means of introducing additional phenols when and if this is necessary. Returning to separation step 13, the sodium carbonate solution is withdrawn through line 20 and passed to electrolysis step 21. Additional carbonate solution may be introduced to the system through line 22. The electrolysis step consists of any suitable type of electrolytic apparatus, preferably of the type known as the bipolar, multiple cell, generator which consists of a plurality of iron electrode plates clamped together in a frame and insulated from one another by a porous diaphragm. Each plate is recessed on both sides so that each pair of plates forms a cell with a diaphragm dividing it. One side of a plate may be nickel-plated to form the anode and the other side which is of iron forms the cathode of the adjacent cell. When the sodium carbonate solution is electrolyzed, the sodium hydroxide is generated at the cathode and sodium bicarbonate at the anode. These solutions may be withdrawn by appropriate methods from the respective halves of the cells and utilized in the manner described, the sodium hydroxide solution being passed from line 4 to the treating step and sodium bicarbonate solution through line 11 to the first step of the caustic recovery system.

The treating step is normally carried out at a temperature of approximately atmospheric, say of the order of 50–100° F. The electrolysis of the carbonate solution is usually carried out at a temperature of 150–200° F.

The following example is given to illustrate the usefulness and practicability of the invention but should not be construed as limiting it to the exact conditions given therein or the exact solutions employed.

A sour Mid-Continent cracked gasoline having a mercaptan content of 0.05% may be treated in the manner described in a countercurrent treating system using approximately equal volumes of treating solution and gasoline. The mercaptan content may be reduced to 0.002. The spent treating solution may then be mixed with the sodium bicarbonate solution formed in the electrolysis step, separated, and the phenols recovered and recirculated after removing the mercaptans by steam distillation in a conventional bubble column. The sodium carbonate solution may be returned to the electrolysis step and converted into sodium hydroxide and sodium bicarbonate solution which may be reused in the process. The step for treating the spent treating solution with sodium bicarbonate may be carried out at approximately 140–175° F.

I claim as my invention:

1. A process for sweetening low boiling petroleum distillates containing mercaptans which comprises electrolyzing a solution of an alkali metal carbonate to form an alkali metal hydroxide solution and an alkali metal bicarbonate solution, treating the petroleum distillate with said hydroxide solution to transfer mercaptans from the former to the latter, separating the thus treated distillate from the hydroxide solution and recovering the same as a product of the process, commingling the separated mercaptan-containing hydroxide solution with said bicarbonate solution to liberate the mercaptans and form alkali metal carbonate solution, removing the mercaptans and returning the last-named solution to the aforesaid electrolyzing step.

2. The process as defined in claim 1 further characterized in that the petroleum distillate is treated with the hydroxide solution in the presence of a phenol which is subsequently separated from the solution and mercaptans and returned to the distillate treating step.

3. The process as defined in claim 1 further characterized in that said alkali metal carbonate is sodium carbonate.

WAYNE L. BENEDICT.